United States Patent
Bean et al.

(10) Patent No.: US 6,800,343 B1
(45) Date of Patent: Oct. 5, 2004

(54) PRINT MEDIA HAVING A STRETCHABLE PORTION

(75) Inventors: Heather N. Bean, Fort Collins, CO (US); Mark Nelson Robins, Greeley, CO (US); Matthew Flach, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 61 days.

(21) Appl. No.: 10/075,156

(22) Filed: Feb. 13, 2002

(51) Int. Cl.$^7$ .................................................. B41M 5/40
(52) U.S. Cl. ............................... 428/32.39; 428/32.51; 428/32.12
(58) Field of Search .............................. 428/195, 211, 428/480, 521, 537.5, 32.39, 32.51, 32.12

(56) References Cited

U.S. PATENT DOCUMENTS

| | | | |
|---|---|---|---|
| 5,698,621 A | 12/1997 | Nguyen et al. | 524/297 |
| 5,756,153 A | 5/1998 | Plourde | 427/207.1 |
| 5,813,772 A | 9/1998 | Magill et al. | 400/120.01 |
| 5,922,625 A | 7/1999 | Haruta et al. | 442/75 |
| 5,955,167 A | 9/1999 | Onishi et al. | 428/41.5 |
| 6,106,910 A | 8/2000 | Tan et al. | 428/29 |
| 6,224,958 B1 | 5/2001 | Mahn, Jr. | 428/40.1 |
| 6,231,177 B1 | 5/2001 | Cherukuri et al. | 347/105 |
| 6,245,422 B1 | 6/2001 | Onishi et al. | 428/331 |
| 6,255,665 B1 | 7/2001 | Elgee et al. | 250/559.4 |
| 6,551,692 B1 * | 4/2003 | Dalvey et al. | 428/195 |
| 2003/0175505 A1 * | 9/2003 | Bean et al. | 428/343 |
| 2003/0228449 A1 * | 12/2003 | Robins et al. | 428/182 |

* cited by examiner

*Primary Examiner*—Cynthia H. Kelly
*Assistant Examiner*—B. Shewareged

(57) ABSTRACT

A print media having a first sheet that is elastic about a plane of its printable surface is adhered to a second sheet that is rigid about the plane of the printable surface. The two sheets are separable such that the first sheet may be separated from the second sheet after transferring a desired image to the printable surface. By transferring an image to the printable surface of the first sheet, and by subsequently removing the second sheet, a stretchable image is produced on the first sheet.

16 Claims, 5 Drawing Sheets

PRINT MEDIA HAVING A STRETCHABLE PORTION

TECHNICAL FIELD OF THE INVENTION

The present invention relates generally to print media, and in particular to print media having a stretchable portion.

BACKGROUND OF THE INVENTION

Imaging devices, e.g., inkjet printers, laser printers, plotters, copiers, facsimile machines or multi-function devices, use marking materials, e.g., ink or toner, to print text, graphics and other images onto print media. The print media may be of a variety of types, commonly including paper, card stock, transparencies, envelopes, photographic print stock, cloth, etc. Some common forms of print media include cut-sheet stock, roll stock, tractor-feed stock and fan-fold stock. The chosen form is generally dictated by the imaging device in terms of what it is designed to use. For example, an imaging device designed for cut-sheet stock will generally be unable to handle roll stock or tractor-feed stock. However, it may be able to use fan-fold stock.

The print media generally share some common characteristics. They are flexible, with some being more flexible than others. This is due primarily to the weight of the stock. For example, photographic print stock and card stock are typically stiffer than standard paper stock. Being flexible, the print media can be folded or curled. However, print media exhibits a degree of rigidity in the plane of the printable surface, i.e., when stressed in a direction parallel to the plane of the printable surface, the print media will tend to maintain its dimensions.

A degree of rigidity a desirable characteristic in that a more accurate reproduction of the desired image is attainable if the print media does not deform in the plane of the printable surface as it is fed through or otherwise processed by the imaging device. However, this degree of rigidity also limits the uses of the resulting output image.

For the reasons stated above, and for other reasons stated below that will become apparent to those skilled in the art upon reading and understanding the present specification, there is a need in the art for alternative types of print media.

SUMMARY

Methods and print media for producing stretchable images are described herein. A print media having a first sheet that is elastic about a plane of its printable surface is adhered to a second sheet that is rigid about the plane of the printable surface. These two sheets are separable such that the first sheet may be separated from the second sheet after transferring the desired image to the printable surface. By transferring an image to the printable surface of the first sheet, and by subsequently removing the second sheet, a stretchable image is produced.

For one embodiment, the invention provides a print media for use in an imaging device. The print media includes a first sheet having a printable surface and a second surface opposite the printable surface. The first sheet is deformable about a plane of the printable surface. The print media further includes a second sheet adhered to the second surface of the first sheet. The second sheet is rigid about the plane of the printable surface and the first sheet is separable from the second sheet.

For another embodiment, the invention provides a print media for use in an imaging device. The print media includes a carrier layer, an elastomeric layer and an adhesive layer interposed between the carrier layer and the elastomeric layer. The side of the elastomeric layer opposite the adhesive layer is adapted to accept marking material and either the carrier layer or the elastomeric layer is adapted to release from the adhesive layer.

For yet another embodiment, the invention provides a method of generating a stretchable image. The method includes generating image data and generating an output image on a printable surface of a print media in response to the image data. The print media includes an elastomeric sheet having the printable surface, the elastomeric sheet being adhered to a carrier layer. The method further includes separating the elastomeric sheet from the carrier layer.

Further embodiments of the invention include apparatus and methods of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
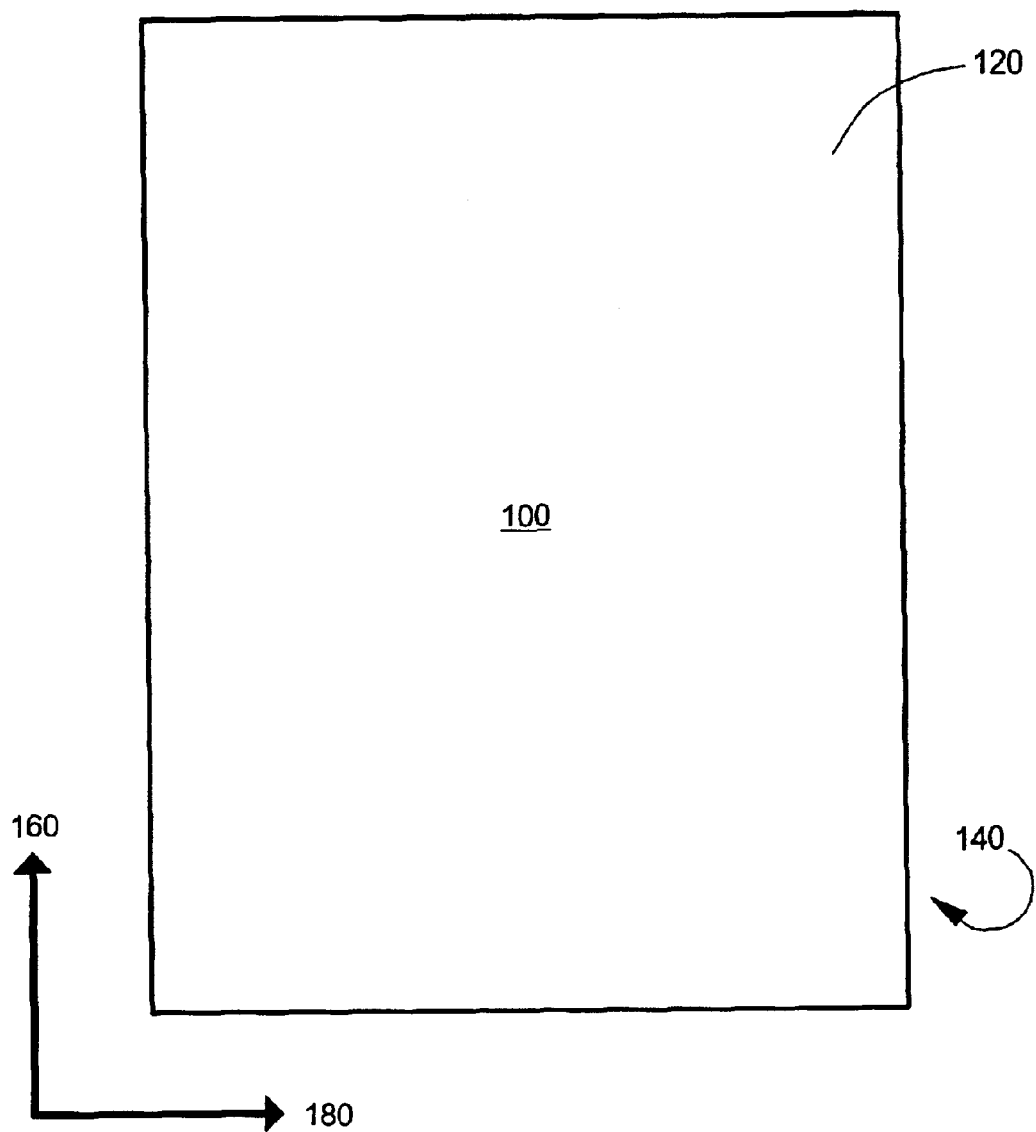
FIG. 1 is a top view of a print media in accordance with an embodiment of the invention.

FIG. 1 is a top view of a print media 100 in accordance with an embodiment of the invention having a first sheet 120 and a second sheet 140. The second sheet 140 extends behind the plane of the figure. The print media 100 is generally rigid in the plane of the figure such that the print media 100 will tend to maintain its dimensions when stress is applied in a first direction 160 and/or a second direction 180. The embodiment of FIG. 1 is of a cut-sheet type, although other formats are suitable for use.

Figure 2:
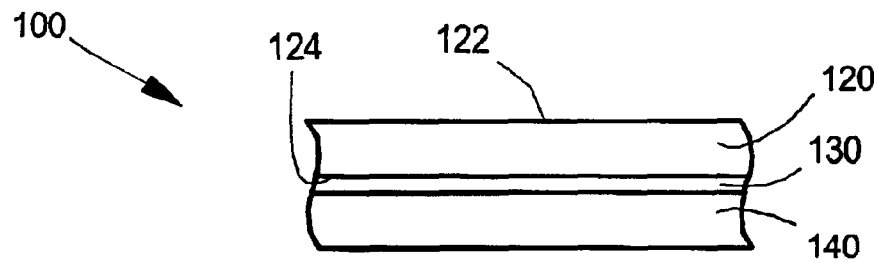
FIG. 2 is a side view of a portion of a print media in accordance with an embodiment of the invention.

FIG. 2 is a side view of a portion of a print media 100 in accordance with an embodiment of the invention. The print media 100 of FIG. 2 includes the first sheet 120 and the second sheet 140. The first sheet 120 includes a first surface or printable surface 122 and a second surface 124 opposite the printable surface 122.

The first sheet 120 is elastic about a plane of the printable surface 122. The first sheet 120 is thus stretchable when stressed in the first direction 160 and/or the second direction 180, and will tend to return to its original dimensions upon removal of the stress. Useful materials for the first sheet 120 include rubbers, elastomers and other elastomeric materials. The first sheet 120 may be opaque, translucent or transparent. Furthermore, while white is generally the most common color of print media, the first sheet 120 may be dyed, tinted or pigmented to some color other than white.

Certain materials may be sufficiently porous, or have other surface characteristics, allowing them to take up ink or other marking materials with relative ease. However, for those materials that are resistant to taking up or otherwise accepting marking materials, print coatings and other surface treatments, e.g., corona treatment, are well known to increase the printability of a surface.

The second sheet 140 is a carrier for the first sheet 120, providing the necessary structural integrity and rigidity for use in imaging devices, particularly those personal printers and copiers found in many homes and offices. As such, it is semi-rigid, exhibiting flexibility yet resisting deformation when stressed in either the first direction 160 or the second direction 180. Some common examples of materials used in the label industry for such purposes include paper and polyester carrier layers.

The first sheet 120 and the second sheet 140 are adhered with an interposing layer of adhesive 130. The layer of adhesive 130 lies between the second sheet 140 and the second surface 124 of the first sheet 120.

For one embodiment, the layer of adhesive 130 is a pressure-sensitive adhesive. Pressure-sensitive adhesives tend to retain their tack unless their surface is fouled with contaminants, such as dust, lint or oil. These types of adhesives are common on self-stick labels, tapes, stickers, etc. A particular example of pressure-sensitive adhesives is the class of cross-linked acrylic polymers.

For another embodiment, the layer of adhesive 130 is a dry adhesive, also called a fugitive bond adhesive. These adhesives exhibit a level of tack activated by heat or a solvent sufficient to bond two surfaces together. Once cooled or dried, the adhesive maintains high shear strength between the bonded surfaces, but loses much of its peel strength. Furthermore, such adhesives are substantially tack-free when peeled away or otherwise removed from a bonded surface. Examples include resin-based adhesives as well as certain hot-melt and other thermoplastic adhesives.

Figure 3A:
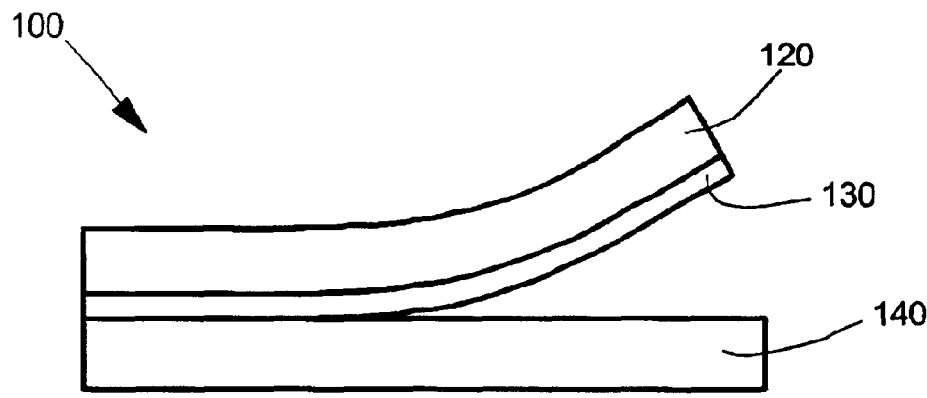
FIG. 3A is a side view of the print media of FIG. 2 in accordance with a further embodiment of the invention.

FIG. 3A is a side view of the print media 100 of FIG. 2 in accordance with a further embodiment of the invention showing the separation of the first sheet 120 from the second sheet 140. For the embodiment of FIG. 3A, the second layer 140 is adapted to release from the adhesive layer 130. Thus, the adhesive layer 130 is configured to remain on the second surface of the first sheet 120 upon separation of the first sheet 120 from the second sheet 140.

Adapting the second sheet 140 to release from an adhesive is generally accomplished by causing the adhesive to have a higher affinity for the first sheet 120 than the second sheet 140. This relative adhesion may be the result of the inherent adhesion differences between the materials chosen for the first sheet 120 and the second sheet 140. For example, cross-linked acrylic polymers would generally have a higher affinity to a rubber surface than to a polyolefin surface. However, it is more common to apply a primer to one surface, e.g., the second surface 124 of the first sheet, to increase its adhesion and/or to apply a release agent to the opposing surface, the second sheet 140, to reduce its adhesion. For an embodiment utilizing a pressure-sensitive adhesive in the adhesive layer 130, the print media 100 shown in FIG. 3A is particularly useful in the preparation of a stretchable sticker.

Figure 3B:
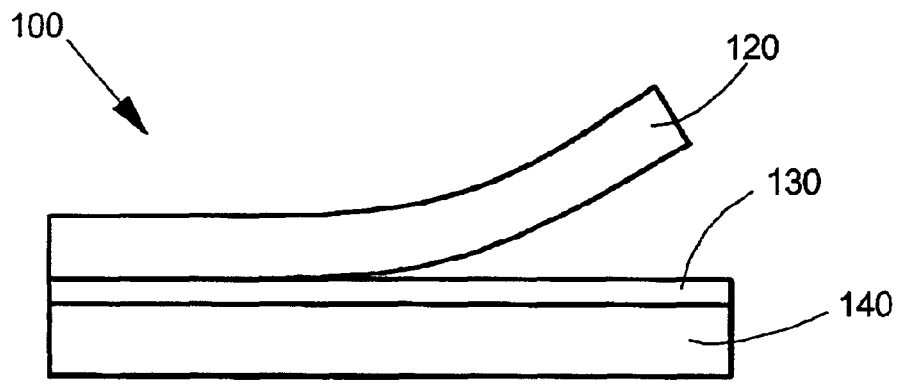
FIG. 3B is a side view of the print media of FIG. 2 in accordance with a still further embodiment of the invention.

FIG. 3B is a side view of the print media 100 of FIG. 2 in accordance with a still further embodiment of the invention showing the separation of the first sheet 120 from the second sheet 140. For the embodiment of FIG. 3B, the first layer 120 is adapted to release from the adhesive layer 130 using a process similar to that described with reference to FIG. 3A. Thus, the adhesive layer 130 is configured to remain on the second sheet 140 upon separation of the first sheet 120 from the second sheet 140. An embodiment of the type shown in FIG. 3B is preferably formed using a dry adhesive for the adhesive layer 130, although there is no prohibition to using a pressure-sensitive adhesive. In fact, if the surface of the second sheet 140 opposite the surface adhered to the adhesive layer 130 is also a printable surface, an image could be generated on both the first sheet 120 and the second sheet 140 to produce both a stretchable image from the separated first sheet 120 and a sticker or label from the separated second sheet 140.

Figure 4:
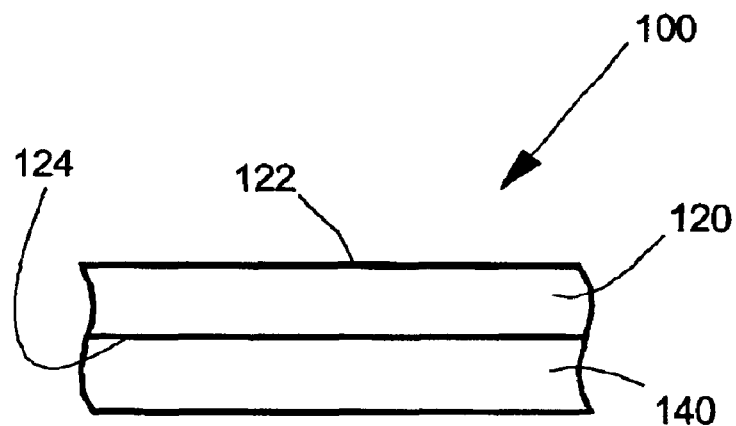
FIG. 4 is a side view of a portion of a print media in accordance with another embodiment of the invention.
Figure 5:
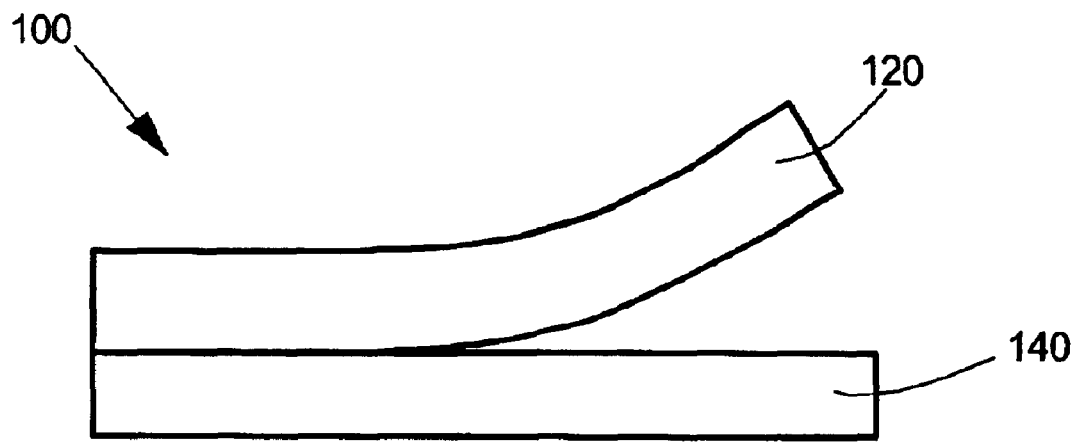
FIG. 5 is a side view of the print media of FIG. 4.

FIG. 4 is a side view of a portion of a print media 100 in accordance with another embodiment of the invention. The print media 100 of FIG. 4 includes the first sheet 120 and the second sheet 140. The first sheet 120 includes a first surface or printable surface 122 and a second surface 124 opposite the printable surface 122. However, the first sheet 120 and the second sheet 140 of FIG. 4 are adhered through static forces, without the need for an adhesive layer. The first sheet 120 is elastic about a plane of the printable surface 122 and generally follows the same requirements as described with reference to FIG. 2. The second sheet is rigid about the plane of the printable surface 122 and generally follows the same requirements as described with reference to FIG. 2. FIG. 5 is a side view of the print media 100 of FIG. 4 showing the separation of the first sheet 120 from the second sheet 140.

In use, the print media 100 is supplied or fed to an imaging device, e.g., inkjet printers, laser printers, copiers and other similar imaging devices, whether local or networked. An image is generated on the printable surface 122 of the print media 100 and the first sheet 120 is separated from the second sheet 140. Due to the elastomeric properties of the first sheet 120, the image produced on the first sheet 120 is a stretchable image. The stretchable image may be used as a toy or plaything for a child or child-at-heart. For example, a child could print a picture of a person or pet and then "morph" it by stretching the image. Furthermore, given the elastomeric properties of the first sheet 120, the image is less prone to creasing. This can provide a "ruggedized" image. For example, a photograph could be printed onto a print media in accordance with the invention. The resulting stretchable photograph could be stuffed in a pocket or book bag, for example, without the fear of creasing that would attend a standard photograph.

Figure 6:
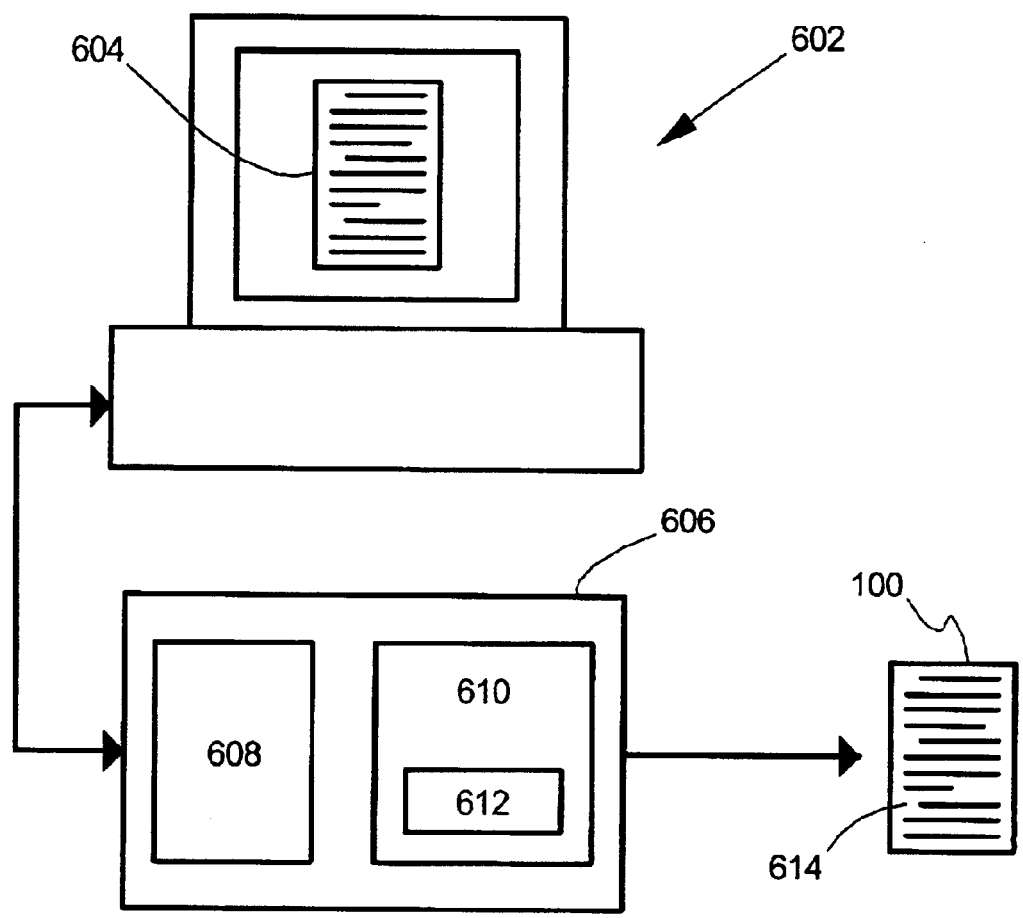
FIG. 6 is a schematic of a system for use in generating a stretchable image in accordance with an embodiment of the invention.

FIG. 6 is a schematic of a system for use in generating a stretchable image in a preferred embodiment of the invention. The system includes a personal computer, workstation or other processor-based device 602 used to generate an image representation 604. The image representation 604 can represent anything within the imagination of the user, whether it be text, a drawing, a photograph or some other image representation. The processor-based device 602 generates image data representative of the image representation 604. The image data is provided to an imaging device 606. For one embodiment, the imaging device 606 is an inkjet printer, although other imaging devices as described above are also usable with embodiments of the invention. If the imaging device 606 is in direct communication with the processor-based device 602, e.g., a printer coupled to a personal computer, the imaging device 606 is termed a local imaging device. If communication between the processor-based device 602 and the imaging device 606 is through a communication network, the imaging device 606 is termed a network imaging device.

The imaging device 606 has a formatter 608 for interpreting the image data and rendering the image data into a printable image. The printable image is provided to a print engine 610 to produce a tangible output image 614. The output image 614 is produced on a print media 100 in accordance with an embodiment of the invention. The print engine 610 represents the mechanical aspects of the imaging device 606. The print engine 610 further includes a source 612 for supplying the print engine 610 with the print media 100. Examples of the source 612 include media trays or by-pass feeders. For another embodiment, the imaging device 606 is capable of generating its own image data without the need for the processor-based device 602, e.g., a copier via scanning an original tangible image.

Figure 7A:
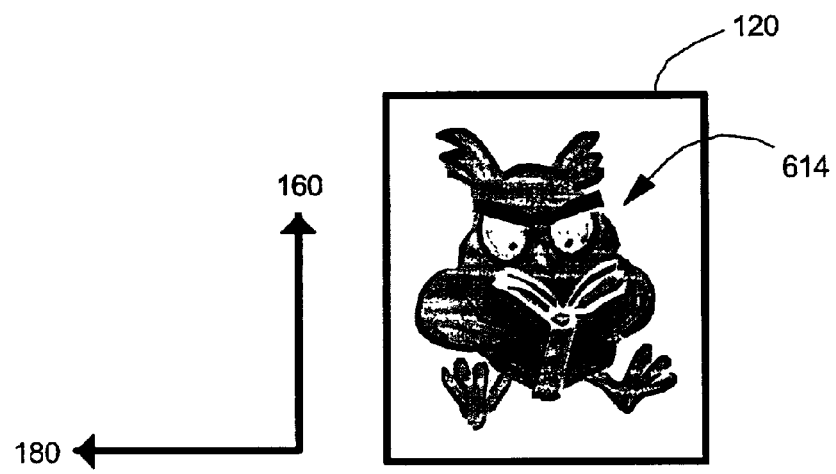
FIG. 7A is a top view of an output image in a non-deformed state.
Figure 7B:
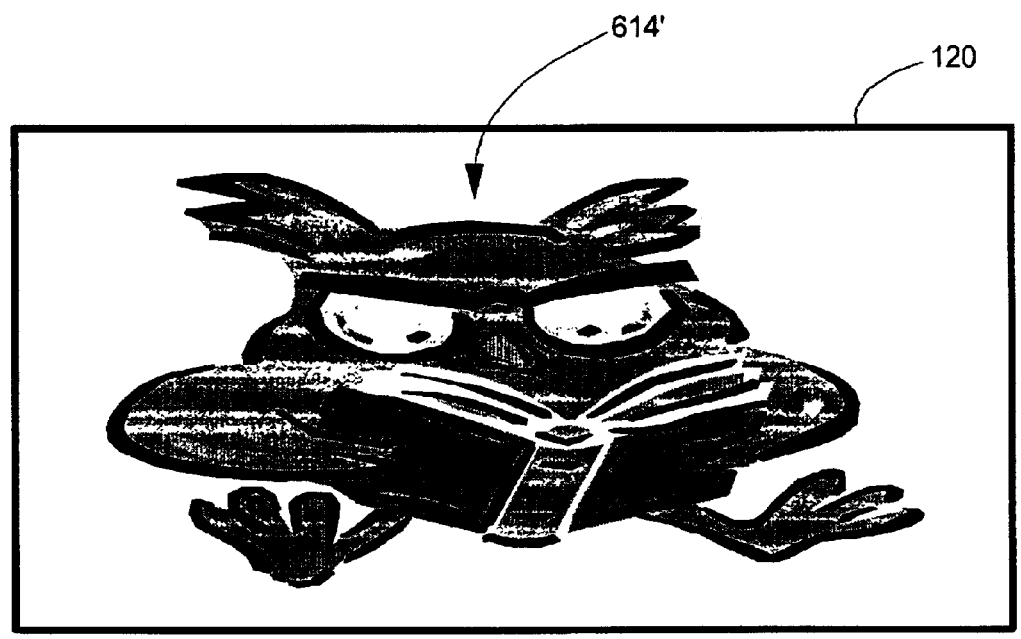
FIG. 7B is a top view of an output image in a deformed state.

Upon production of the output image 614 on the printable surface 122 of the first sheet 120 of the print media 100, the first sheet 120 may be separated from the second sheet 140. FIG. 7A is a top view of an output image 614 on a first sheet 120 in a non-deformed state. As shown in FIG. 7B, the output image 614 may be deformed by applying stress, e.g., pulling or stretching, in one or both of the directions 160 and 180 to yield the deformed output image 614'. Upon release of the stress, the deformed output image 614' can return to its original shape or dimensions.

CONCLUSION

Methods and print media for producing stretchable images have been described herein. A print media having a first sheet that is elastic about a plane of its printable surface is adhered to a second sheet that is rigid about the plane of the printable surface. These two sheets are separable such that the first sheet may be separated from the second sheet after transferring the desired image to the printable surface. By transferring an image to the printable surface of the first sheet, and by subsequently removing the second sheet, a stretchable image is produced.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A print media for use in an imaging device for personal or office use, the print media comprising:
   a first sheet having a printable surface and a second surface opposite the printable surface, wherein the first sheet is rubber; and
   a second sheet adhered to the second surface of the first sheet, wherein the second sheet is rigid about the plane of the printable surface;
   wherein the first sheet is separable from the second sheet;
   wherein the second sheet is adhered to the second surface of the first sheet using a pressure sensitive adhesive interposed between the second sheet and the second surface of the first sheet; and
   wherein the pressure sensitive adhesive is configured to remain on the second sheet upon separation of the first and second sheets.

2. The print media of claim 1, further comprising a release agent interposed between the pressure sensitive adhesive and the first sheet.

3. The print media of claim 1, wherein the printable surface contains a surface treatment.

4. The print media of claim 3, wherein the surface treatment is selected from the group consisting of a corona treatment of the printable surface and a print coating applied to the printable surface.

5. The print media of claim 1, wherein the first sheet has a characteristic selected from the group consisting of opaque, translucent and transparent.

6. The print media of claim 1, wherein the second sheet comprises a material selected from the group consisting of paper, high-density polyolefins and polyesters.

7. A print media for use in an imaging device for personal or office use, the print media comprising:
   a carrier layer;
   rubber sheet; and
   an adhesive layer interposed between the carrier layer and the rubber sheet;
   wherein a side of the rubber sheet opposite the adhesive layer is adapted to accept marking material; and
   wherein the rubber sheet is adapted to release from the adhesive layer.

8. The print media of claim 7, wherein the adhesive layer comprises a pressure-sensitive adhesive.

9. The print media of claim 7, wherein the adhesive layer comprises a dry adhesive.

10. A print media for use in an imaging device, the print media comprising:
    a first sheet having a printable surface and a second surface opposite the printable surface, wherein the first sheet is rubber; and
    a second sheet having a first surface adhered to the second surface of the first sheet by an adhesive interposed between the first surface of the second sheet and the second surface of the first sheet;
    wherein the first sheet is adapted to release from the adhesive.

11. The print media of claim 10, wherein the adhesive is a pressure-sensitive adhesive.

12. The print media of claim 10, wherein the second sheet further comprises a printable surface opposite the first surface of the second sheet.

13. The print media of claim 10, wherein the printable surface contains a surface treatment.

14. The print media of claim 10, wherein the first sheet has a characteristic selected from the group consisting of opaque, translucent and transparent.

15. The print media of claim 10, wherein the second sheet comprises a material selected from the group consisting of paper, high-density polyolefins and polyesters.

16. The print media of claim 10, wherein the adhesive is dry adhesive.

* * * * *